United States Patent

Kao et al.

[15] 3,663,898

[45] May 16, 1972

[54] EQUALIZER

[72] Inventors: Chih-Yu Kao, Lawrence; Carl F. Kurth, Andover, both of Mass.

[73] Assignee: Bell Telephone Laboratories, Incorporated, Murray Hill, N.J.

[22] Filed: Dec. 17, 1969

[21] Appl. No.: 885,798

[52] U.S. Cl. ....................333/18, 333/28, 330/26, 330/107

[51] Int. Cl. ....................H04b 3/14

[58] Field of Search ....................333/18, 28, 29, 70 T; 330/26, 330/172, 107; 331/18

[56] References Cited

UNITED STATES PATENTS

| | | | |
|---|---|---|---|
| 3,368,167 | 2/1968 | Graham | 333/18 |
| 3,383,616 | 5/1968 | Friend et al. | 330/26 |
| 3,336,539 | 8/1967 | Kwartiroff | 333/18 |
| 3,482,190 | 12/1969 | Brenin | 333/29 |
| 3,518,581 | 6/1970 | Hughes | 333/70 |
| 2,907,838 | 10/1959 | Ross | 330/172 |

*Primary Examiner*—Herman Karl Saalbach
*Assistant Examiner*—C. Baraff
*Attorney*—R. J. Guenther and E. W. Adams, Jr.

[57] ABSTRACT

A multibump equalizer having a main path which comprises an amplifier and a summing network and a plurality of feedback paths each including an individual amplifier and shaping network connected from the output of the equalizer to individual inputs to the summing network. All amplifiers and the summing network can be realized with a single operational amplifier.

2 Claims, 3 Drawing Figures

INVENTORS C. KAO
C. F. KURTH
BY John P. McDonnell
ATTORNEY

EQUALIZER

BACKGROUND OF THE INVENTION

This invention relates to signal transmission systems and, more particularly, to equalizing networks employed in such systems.

An unequalized transmission system, whether it is made up of a single pair of wires or a coaxial cable, seldom exhibits transfer characteristics which are appropriate for sending television, multiplex telephone, or data signals over long distances. Normally such signals require a medium which exhibits a substantially flat loss-frequency characteristic. When the facility is installed, therefore, manually adjustable equalizers are used to compensate for those imperfections which are substantially constant. Since transmission is also a function of ambient temperature and other unpredictable parameters which are not constant, it is also necessary to provide automatically adjustable equalizers, normally called regulators, to correct for transmission deviations which vary with time.

The automatically adjustable equalizers of the prior art often employ a relatively large number of individual amplifiers and shaping networks with two or three shaping networks employed for every amplifier. In a typical equalizer of this type, amplifiers and shaping networks are alternately connected in series between input and output hybrid transformers with each amplifier having a shaping network connected around the amplifier in a local feedback loop. Each shaping network is designed to introduce loss at a different band of frequencies in the signal band spectrum with some overlap to provide equalization throughout the whole signal spectrum. The amplifiers are included to provide impedance matching between the shaping networks. The loss introduced by the shaping networks is usually automatically varied by a control circuit in accordance with the deviations introduced by the transmission system on one or more reference signals. Unpredictable transmission deviations with time are thereby equalized.

The relatively large number of amplifiers required by these automatic equalizers appreciably increase the cost of the equalizing unit. The need for hybrid transformers also increases the unit cost and, moreover, introduces trans-hybrid losses and phase shift over the wideband range of frequencies. Other schemes which could be devised using these prior art techniques to avoid either one or more of the impedance matching, loss, and phase shift problems have proved to be difficult to realize physically. All such prior art equalizer schemes additionally introduce amplifier noise which interferes with the quality of transmission.

It is, therefore, an object of this invention to provide an equalization network which eliminates the need for impedance matching amplifiers and hybrid transformers.

It is a further object of the invention to physically realize the foregoing object simply and at a lower cost than the equalizing networks of the prior art.

It is still a further object of the invention to reduce substantially the noise introduced by the amplifiers of the prior art.

SUMMARY OF THE INVENTION

The present invention is directed to a multibump equalizer having a main path which comprises an amplifier and a summing network. A plurality of parallel connected feedback paths, each comprising an individual serially connected amplifier and shaping network, are connected from the output of the equalizer to individual inputs of the summing network. Each shaping network provides equalization over an individual frequency band which overlaps with adjacent bands to provide equalization over the entire frequency spectrum. Because of its very high, ideally infinite, gain, a single operational amplifier may be employed to provide all the amplifier stages and the summing stage, thereby eliminating the need for impedance matching and reducing the noise introduced by the amplifiers.

BRIEF DESCRIPTION OF THE DRAWINGS

Other objects and features of the present invention will be apparent from the following discussion and drawings in which.

DETAILED DESCRIPTION OF THE INVENTION

Figure 1:
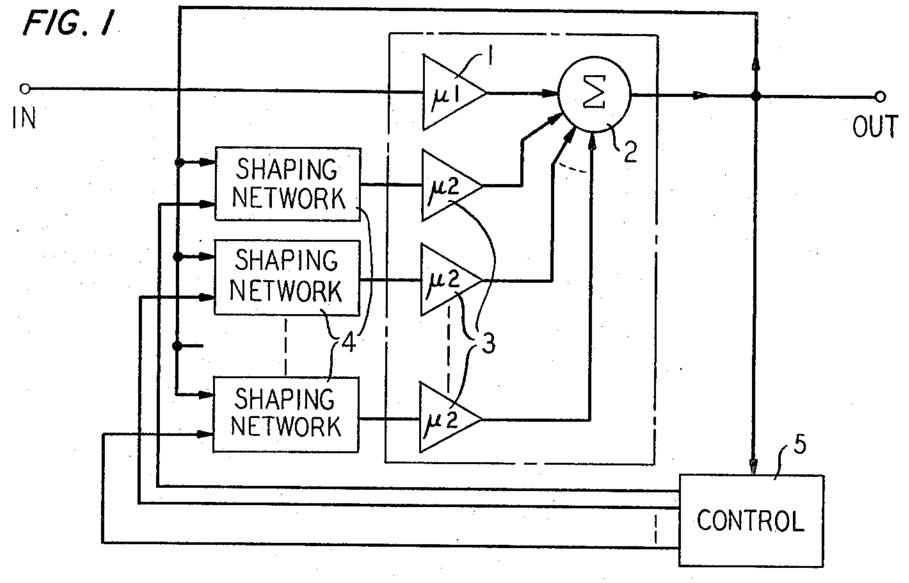
FIG. 1 is a block diagram embodiment of the present invention.

In the equalizer of FIG. 1, the main path comprises an amplifier 1 and a summing network 2 connected between the equalizer input and output terminals. Summing network 2 has a plurality of inputs and a single output. A plurality of feedback loops, each of which comprises an individual amplifier 3 and an individual shaping network 4, are connected from the output of the summing network 2 to individual inputs of the summing network 2. As discussed hereinafter, the exact number of feedback loops will be determined by the frequency spectrum over which equalization is desired and the desired "accuracy" of equalization over this range. Each of the shaping networks 4 is also connected to a control circuit 5, the latter of which is connected to the equalizer output terminal. As can be seen from FIG. 1 of the drawing, the gain of the amplifier 1 is designated $\mu_1$, while the gain of each of the plurality of amplifiers 3 is designated as $\mu_2$, for ease in describing the invention only, as discussed hereinafter. The dashed box surrounding the amplifiers 1 and 3 and the summing network 2 indicates that all these elements may be provided with a single operational amplifier.

Figure 2:
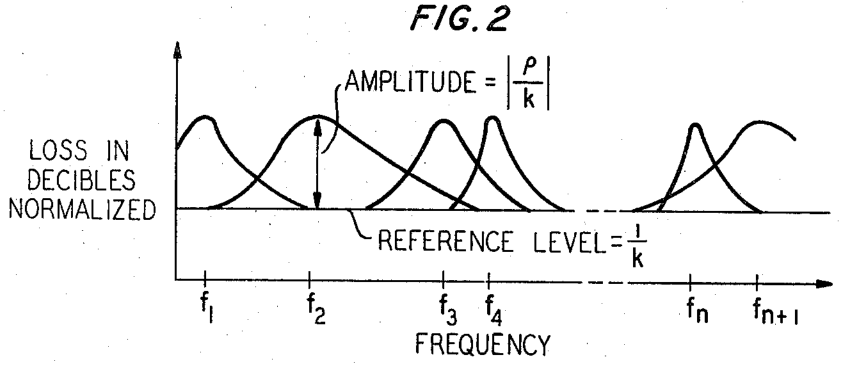
FIG. 2 illustrates a multibump equalization characteristic useful in describing the function of the embodiment of FIG. 1.

Input signals to the equalizer of FIG. 1 are amplified by amplifier 1 and fed to an input of the summing network 2. The output signal of the summing network 2 appears at the equalizer output terminal with a portion of this signal fed back through each of the shaping networks 4 and associated amplifiers 3 to the individual inputs of the summing network 2. Each of the shaping networks 4 equalizes an individual band of frequencies within the signal band spectrum. The transmission characteristics of the shaping networks may overlap to insure equalization throughout the entire signal band spectrum. If the shaping networks of FIG. 1 were to employ circuitry which has a bump loss vs. frequency characteristics, a multibump equalization characteristic such as illustrated in FIG. 2 results. In the multibump transmission characteristic of FIG. 2, the "first" shaping network introducing a bump which peaks at frequency $f_1$; the "second" shaping network introduces a bump which peaks at frequency $f_2$; and so on to the "$n$+1" shaping network which introduces a bump which peaks at frequency $f_{n+1}$. As discussed hereinafter, the amplitude of the bumps may be varied automatically by the control circuit 5 in accordance with unpredictable transmission deviations such as those due to ambient temperature.

Figure 3:
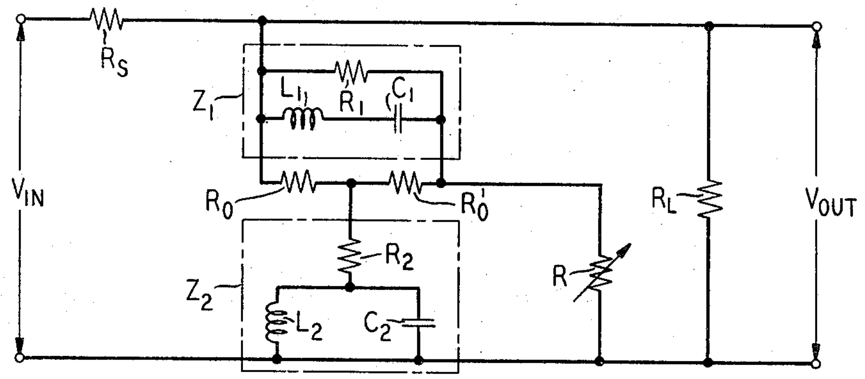
FIG. 3 schematically illustrates a constant-R bridged-T network which may be employed as a shaping network in FIG. 1.

The shaping networks 4 may be any compatible network which provides a desired equalization characteristic. As noted heretofore, for the multibump equalization characteristic of FIG. 2 a shaping network which simulates the bump shape could be used. One network which might be employed in such a system is the constant-R bridged-T network illustrated in FIG. 3. In the circuit of FIG. 3, a resistor $R_s$ is serially connected with the shaping network input terminals and a resistor $R_L$ shunts the output terminals. Resistors $R_o$, $R_o'$, and R are serially connected across resistor $R_L$. The parallel combination of resistor $R_1$, and the series connected inductor $L_1$ and capacitor $C_1$, are connected across the combination of resistors $R_o$ and $R_o'$. Inductor $L_2$ is serially connected with resistor $R_2$ across resistors $R_o'$ and R. Capacitor $C_2$ is connected across inductor $L_2$. For simplicity in the treatment of this network, the components $R_1$, $L_1$, and $C_1$ are shown in a dashed box as impedance $Z_1$, while the components $R_2$, $L_2$, and $C_2$ are shown in a second dashed box as impedance $Z_2$.

Constant-R bridged-T type shaping networks of the type illustrated in FIG. 3 are well known in the art and are discussed in detail at page 229 et seq. of the text Electric Network Synthesis by Myril B. Reed published in 1955 by Prentice-Hall, Inc. For present purposes it appears sufficient to note that the voltage transfer function of the circuit of FIG. 3 may be expressed as follows:

$$\frac{V\text{out}}{V\text{in}}=\frac{1}{k}\left[1+\rho\frac{R_0^2}{(Z_1+R_0)^2}\right], \qquad (1)$$

where $$R_s=\frac{R_0R_L}{R_L-R_0}, \qquad (R_L>R_0);$$

$$\frac{1}{k}=\frac{R_L-R_0}{2R_L};$$

$$R_0=R_0'; \text{ and}$$

$$\rho=\frac{R-R_0}{R+R_0}.$$

From the transfer function of equation (1), it is seen that the voltage transfer function has a positive or negative bump of amplitude $$\left|\frac{\rho}{k}\right|$$

with respect to the reference level $1/k$. From this equation the shape of the bump is determined by the real part of the function $$\alpha=\frac{R_0^2}{(Z_1+R_0)^2} \qquad (2)$$

and is centered around a frequency $$f=1/2\pi\sqrt{LC} \qquad (3)$$

where $LC=L_1C_1=L_2C_2$. (Since the loss or gain of the equalizer usually only need be figured to a first approximation, only the real part of $\alpha$ need be considered.) In the transmission characteristic illustrated in FIG. 2, the center frequencies of each of the shaping networks are shown as $f_1, f_2, f_3, f_4 \ldots f_n$ and $f_{n+1}$; the reference level as $1/k$; and the amplitude of the positive bump as $$\left|\frac{\rho}{k}\right|.$$

(The shape being determined by the real part of the function $$\alpha=\frac{R_0^2}{(Z_1+R_0)^2}$$

as noted heretofore.) The negative bump indicated from the function is not shown on the drawing for simplicity.

The use of the network of FIG. 3 in each of the shaping networks 4 of FIG. 1 would result in the following overall equalizer voltage transfer function $$\frac{V\text{out}}{V\text{in}}=\frac{\mu_1}{1-\mu_2\sum_{i=1}^{n}\frac{1}{k}\left[1+\rho_i\alpha_i\right]} \qquad (4)$$

where $\mu_1$ is the amplification factor of amplifier 1 and $\mu_2$ is the amplification factor of each of the amplifiers 3, as indicated on the drawing. (For simplicity, the gain $\mu_2$ of each of the amplifiers 3 is assumed to be equal. It should be obvious, however, that the amplifiers 3 could, if desired, have unequal gains.)

From the voltage transfer function of the equalizer, and the foregoing discussion of the shaping networks schematically illustrated in FIG. 3, it is readily seen that the parameters of the shaping network determine the shape, amplitude, and level of the signal appearing at the output terminal of the equalizer of FIG. 1. It should be noted in considering the overall transfer function and system that only R of the shaping network of FIG. 3 need be variable, with the other parameters of equations (1) through (4) that determine the transmission characteristics predetermined at the time of the design of the equalizer. If desired, therefore, the frequency $f=1/2\pi\sqrt{LC}$ at which the "peak" of each bump in the characteristic of FIG. 2 occurs; the gain of the amplifiers $\mu_1$ and $\mu_2$; and the shape of the equalization characteristic determined by the shaping network which may be calculated to a first approximation by the real part of the function $$\alpha=\frac{R_0^2}{(Z_1+R_0)^2},$$

will be predetermined and only the $\rho$ term defined in connection with equation (1) varied to control the "amplitude" of each bump, i.e., the loss introduced by the particular shaping network. As can be seen from the definition of the $\rho$ term, this term is varied simply by varying the resistance R.

The resistor R of FIG. 3 may, of course, be any compatible component such as, for example, a thermistor, just as the shaping network 4 of FIG. 1 may be any compatible network which provides a desired equalization characteristic. In such an equalization system, the control circuit 5 of FIG. 1 would control the characteristic of the shaping networks in accordance with the deviations introduced by the transmission system on a reference signal detected at the output of the equalizer. In the case of the shaping network of FIG. 3, for example, the resistor R, or a thermistor inserted in its place, would be varied by either mechanical, electrical, or environment temperature means to vary the amplitude or loss introduced by the equalization bumps in response to unpredictable variations in the transmission characteristics. One such equalization scheme showing such a control network 5 in detail is disclosed in our copending patent application Ser. No. 064,664, filed Oct. 8, 1969 issued as U.S. Pat. No. 3,573,667 on Apr. 6, 1971. Although the transmission characteristic of FIG. 2 is normalized for each shaping network, it should be obvious that a greater or lesser degree of equalization could, and would, be obtained over selected portions of the frequency spectrum in which there were unpredictable transmission variations not affecting the other portions of the frequency spectrum.

In summary, then, the present invention is an equalizer having a single main path and multiple feedback paths. The main path comprises an amplifier and a summing network, while each of the feedback paths comprises an amplifier and a shaping network. In its illustrative embodiment, the shaping network is a constant-R bridged-T network which provides a multibump equalization characteristic, so-called because of the loss vs. frequency characteristic of each of such networks. Each shaping network would be chosen to cover a specific individual frequency band in the overall frequency spectrum with some overlap to insure complete spectrum equalization. The amplitude of each bump would be automatically determined in accordance with the equalization requirements of each frequency band by each shaping network under the control of a control network. With this configuration, each of the amplifiers and the summing network may be realized with a single operational amplifier which is both inexpensive and compact. The cost of prior art equalizers, as well as noise, trans-hybrid loss, and phase shift introduced are thus appreciably reduced or eliminated.

The above-described arrangement is illustrative of the application of the principles of the invention. Other embodiments may be devised by those skilled in the art without departing from the spirit and scope thereof.

What is claimed is:

1. An equalizer having input and output terminals comprising a first amplifier, a plurality of second amplifiers, a summing network having a plurality of inputs and a single output, a plurality of shaping networks, means serially connecting said equalizer input terminal, said first amplifier, one input of said plurality of inputs to said summing network, and said equalizer output terminal, a plurality of parallel negative feedback loops, each of which serially connects an individual one of said plurality of shaping networks and an individual one of said plurality of second amplifiers from said output terminal of said equalizer to a respective individual input of said plurality of inputs of said summing network, each of said shaping networks including a network that provides an individual bump loss versus frequency characteristic over an individual predetermined frequency range which overlaps with the adjacent individual frequency ranges of other of said shaping networks to provide continuous multibump equalization over the entire frequency spectrum to be equalized, a control network, and means connecting said control network to said equalizer output terminal and to each of said plurality of shaping networks to control the amplitude of the bump loss versus frequency characteristic of each of said shaping networks in said parallel negative feedback loops in accordance with a reference signal at said equalizer output terminal.

2. An equalizer in accordance with claim 1 wherein said first amplifier, said plurality of second amplifiers, and said summing network comprises a single operational amplifier.

* * * * *